United States Patent
Stenneth et al.

(10) Patent No.: US 11,293,762 B2
(45) Date of Patent: Apr. 5, 2022

(54) SYSTEM AND METHODS FOR GENERATING UPDATED MAP DATA

(71) Applicant: HERE GLOBAL B.V., Eindhoven (NL)

(72) Inventors: Leon Stenneth, Chicago, IL (US); Ram Marappan, Naperville, IL (US); Danny Savla, Maharashtra (IN); Deekshant Saxena, Maharashtra (IN); Pranil Pandit, Maharashtra (IN)

(73) Assignee: HERE Global B.V., Eindhoven (NL)

( * ) Notice: Subject to any disclaimer, the term of this patent is extended or adjusted under 35 U.S.C. 154(b) by 357 days.

(21) Appl. No.: 16/444,774

(22) Filed: Jun. 18, 2019

(65) Prior Publication Data
US 2020/0400440 A1    Dec. 24, 2020

(51) Int. Cl.
| G01C 21/32 | (2006.01) |
| G06K 9/00 | (2022.01) |
| G06K 9/62 | (2022.01) |
| G06F 16/29 | (2019.01) |
| G06F 16/23 | (2019.01) |
| G08G 1/0968 | (2006.01) |
| H04L 67/10 | (2022.01) |

(52) U.S. Cl.
CPC ......... *G01C 21/32* (2013.01); *G06F 16/2379* (2019.01); *G06F 16/29* (2019.01); *G06K 9/00818* (2013.01); *G06K 9/6201* (2013.01); *G08G 1/0968* (2013.01); *H04L 67/10* (2013.01)

(58) Field of Classification Search
CPC .......... G01C 21/32; G06F 16/2379–29; G06K 9/00818–6201; G08G 1/0968; H04L 67/10
See application file for complete search history.

(56) References Cited

U.S. PATENT DOCUMENTS

| 9,384,402 | B1* | 7/2016 | Furman ............... H04N 19/117 |
| 10,218,941 | B1* | 2/2019 | Park ........................ H04N 1/00 |
| 2010/0328462 | A1* | 12/2010 | Chen ........................ B60R 1/00 348/148 |
| 2012/0162429 | A1* | 6/2012 | Wuerz-Wessel ... G06K 9/00818 348/148 |
| 2012/0271540 | A1* | 10/2012 | Miksa .................. B60W 30/12 701/409 |
| 2013/0058534 | A1* | 3/2013 | Zobel ...................... G06K 9/50 382/103 |
| 2014/0164264 | A1* | 6/2014 | Guttman .............. G06Q 30/018 705/313 |

(Continued)

FOREIGN PATENT DOCUMENTS

CN     106022268 A     10/2016

*Primary Examiner* — Calvin Cheung
(74) *Attorney, Agent, or Firm* — Ditthavong, Steiner & Mlotkowski (57) ABSTRACT

A system, a method, and a computer program product for generating updated map data are provided. The method comprises obtaining first sensor data associated with a plurality of first road signs within a geographic region, obtaining second sensor data associated with the geographic region, and determining a sign matching efficiency for the geographic region, based on the first sensor data and the second sensor data. The method further comprises generating the updated map data, based on the determined sign matching efficiency.

20 Claims, 7 Drawing Sheets

(56) References Cited

U.S. PATENT DOCUMENTS

| | | | |
|---|---|---|---|
| 2014/0193033 A1* | 7/2014 | Huth | G06K 9/00818 |
| | | | 382/103 |
| 2015/0363653 A1* | 12/2015 | Kashiwai | G06K 9/00791 |
| | | | 348/148 |
| 2016/0104049 A1* | 4/2016 | Stenneth | G06K 9/3258 |
| | | | 382/155 |
| 2016/0117923 A1 | 4/2016 | Dannenbring | |
| 2016/0170414 A1* | 6/2016 | Chen | G08G 1/0112 |
| | | | 701/27 |
| 2016/0210520 A1* | 7/2016 | Koide | G06K 9/00818 |
| 2016/0267331 A1* | 9/2016 | Pillai | G06K 9/00791 |
| 2017/0332198 A1 | 11/2017 | Dannenbring et al. | |
| 2018/0188037 A1 | 7/2018 | Wheeler et al. | |
| 2018/0285663 A1* | 10/2018 | Viswanathan | G06K 9/00818 |

* cited by examiner

SYSTEM AND METHODS FOR GENERATING UPDATED MAP DATA

TECHNOLOGICAL FIELD

An example embodiment of the present invention generally relates to mapping and navigation applications, and more particularly relates to a system, a method, and a computer programmable product for generating updated map data for mapping and navigation applications.

BACKGROUND

Various navigation applications are available to provide assistance (for example, directions) for driving, walking, or other modes of travel. Web-based systems and mobile app-based systems offer navigation applications that allow a user to request directions from one point to another. Generally, posted road signs which are posted on a roadside, are learned from sensor data. The sensor data comprises images of a road and road surroundings and/or data thereof. These images or data may also comprise posted road signs which are situated on the side of the road. The sensor data is sent to a map database and stored in the map database. However, sensors used for capturing the images of the road and its surroundings may be limited by accuracy and precision factors. As such, the captured images or data may not be suitable for use in navigation applications. Use of high end sensors may require substantial modification and investment in the existing navigation equipment, thereby increasing the operational overheads. Furthermore, although the sensor data from the high end sensors may have high coverage and provide real time posted speed sign observations, such data may be exceedingly erroneous.

In some scenarios, speed limit value of a road sign captured by sensors may be different from an actual value of the speed limit sign of the road sign. Such erroneous data may lead to undesired navigation conditions and destinations. In some scenarios, the erroneous data may also lead to catastrophic incidents, such as mistakenly reporting a road sign about weight (12 tons) as a speed limit value, like 120 KPH.

SUMMARY

Accordingly, there is a need for a reliable navigation system that validates posted speed sign by determining quality of map based posted speed signs. A, system, a method, and a computer program product are provided herein that focus on generating updated map data based on the determining sign matching efficiency and thus validating learned posted speed signs.

The system, the method and the computer program product are provided in accordance with an example embodiment described herein for generating updated map data.

In one aspect, the system for generating updated map data may be provided. The system may include at least one memory configured to store computer executable instructions and at least one processor configured to execute the computer executable instructions to: obtain first sensor data associated with a plurality of first road signs within a geographic region, obtain second sensor data associated with the geographic region; determine a sign matching efficiency for the geographic region, based on the first sensor data and the second sensor data; and generate the updated map data, based on the determined sign matching efficiency.

In another aspect, a method for generating updated map data may be provided. The method may include: obtaining first sensor data associated with a plurality of first road signs within a geographic region; obtaining second sensor data associated with the geographic region; determining a sign matching efficiency for the geographic region, based on the first sensor data and the second sensor data; and generating the updated map data, based on the determined sign matching efficiency.

In yet another aspect, a computer program product comprising non-transitory a computer-readable medium having stored thereon computer-executable instructions which when executed by one or more processors, cause the one or more processors to carry out operations for generating updated map data, the operations comprising: obtaining first sensor data associated with a plurality of first road signs within a geographic region; obtaining second sensor data associated with the geographic region; determining a sign matching efficiency for the geographic region, based on the first sensor data and the second sensor data; and generating the updated map data, based on the determined sign matching efficiency.

According to some example embodiments, the first sensor data may be captured by a plurality of first sensors for a predefined date. The first sensor data may correspond to one or more first attributes of each of the plurality of first road signs. The one or more first attributes may comprise one or more of sign type, sign value, sign location, side of road, heading, or sign permanency. The second sensor data may be captured by a plurality of second sensors.

According to some example embodiments, the system may be configured to determine the sign matching efficiency. The system may be configured to: filter, based on the predefined date, the second sensor data to obtain date filtered data. The system may be further configured to identify a plurality of road sign images in the date filtered data. The system may be further configured to obtain, one or more second attributes corresponding to each of the plurality of road sign images. The one or more second attributes may comprise one or more of sign type, sign value, sign location, side of road, heading, and sign permanency.

According to some example embodiments, the system may be configured to determine the sign matching efficiency. The system may be configured to determine a matching score based on matching criteria. The matching score may indicate a count of at least one pair of matched road signs between the plurality of first road signs and the plurality of road sign images, and the matching criteria may be based on the one or more first attributes and the one or more second attributes.

According to some example embodiments, the matching criteria may comprise one or more of: a first criterion that the sign type of a road sign in the plurality of first road signs is may be same as the sign type of a road sign in the plurality of road sign images; a second criterion that the sign value of the road sign in the plurality of first road signs may be same as the sign value of the road sign in the identified plurality of road sign images; a third criterion that the heading of the road sign in the plurality of first road signs may be within a threshold value from the heading of the road sign in the plurality of road sign images; a fourth criterion that the longitudinal distance between the road sign in the plurality of first road signs and the road sign in the plurality of road sign images may be within a first threshold distance; or a fifth criterion that the lateral distance between the road sign in the plurality of first road signs and the road sign in the identified plurality of road sign images may be within a second threshold distance.

According to some example embodiments, for determining the sign matching efficiency, the system may be configured to divide the matching score by a count of the identified plurality of road sign images.

According to some example embodiments, the system may be configured to determine a distance between road signs of each pair of the at least one pair of matched road signs. The system may be configured to determine spatial precision for the first sensor data. The spatial precision for the first data may be determined based on the determined distance between road signs of each pair of the at least one pair of matched road signs.

According to some example embodiments, the system may be configured to receive an input specifying the geographic region. The system may be further configured to generate a notification message indicating a degree of reliability of the first sensor data, based on the updated map data. Further the updated map data may be transmitted to at least one vehicle. The system may be configured to transmit the updated map data to the at least one vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

As used in this specification and claims, the terms "for example," "For instance," and "such as, and the verbs "comprising," "having," "including," and their other verb forms, when used in conjunction with a listing of one or more components or other items, are each to be construed as open ended, meaning that that the listing is not to be considered as excluding other, additional components or items. Other terms are to be construed using their broadest reasonable meaning unless they are used in a context that requires a different interpretation.

There is a need for a system and a method to validate learned posted road sign. The system, the method, and the computer program product provided herein are directed towards determining a sign matching efficiency of posted speed signs, and thus validating the accuracy of posted speed signs. The system, the method, and the computer program product provided herein further focus on generating updated map data based on the determined sign matching efficiency.

A solution including the system, the method, and the computer program product disclosed herein focus on generating updated map data based on determining a sign matching efficiency, especially when the data obtained from the consumer vehicle sensors may not be valid. For example, the methods and systems herein are directed towards deciding a degree of reliability and quality of posted speed signs based on determining a sign matching efficiency and in this manner approve and greatly improve the precision of the posted speed signs. The provided solution may thus validate the sign map (that was constructed by consumer vehicle sensor data) using the high end sensor data of dedicated vehicles.

Definitions

The term "link" may be used to refer to any connecting pathway including but not limited to a roadway, a highway, a freeway, an expressway, a lane, a street path, a road, an alley, a controlled access roadway, a free access roadway, and the like.

The term "route" may be used to refer to a path from a source location to a destination location on any link.

The term "road sign" may be used to refer to signs positioned at the side of or above roads to provide information to road users. The road signs may include without limitation, one or more speed limit signs, street name signs, school signs, 'men at work' signs, an underpass sign, an overpass sign and the like.

The term 'autonomous vehicle' may be used to refer to any vehicle, as used having autonomous driving capabilities at least in some conditions.

End of Definitions

Figure 1:
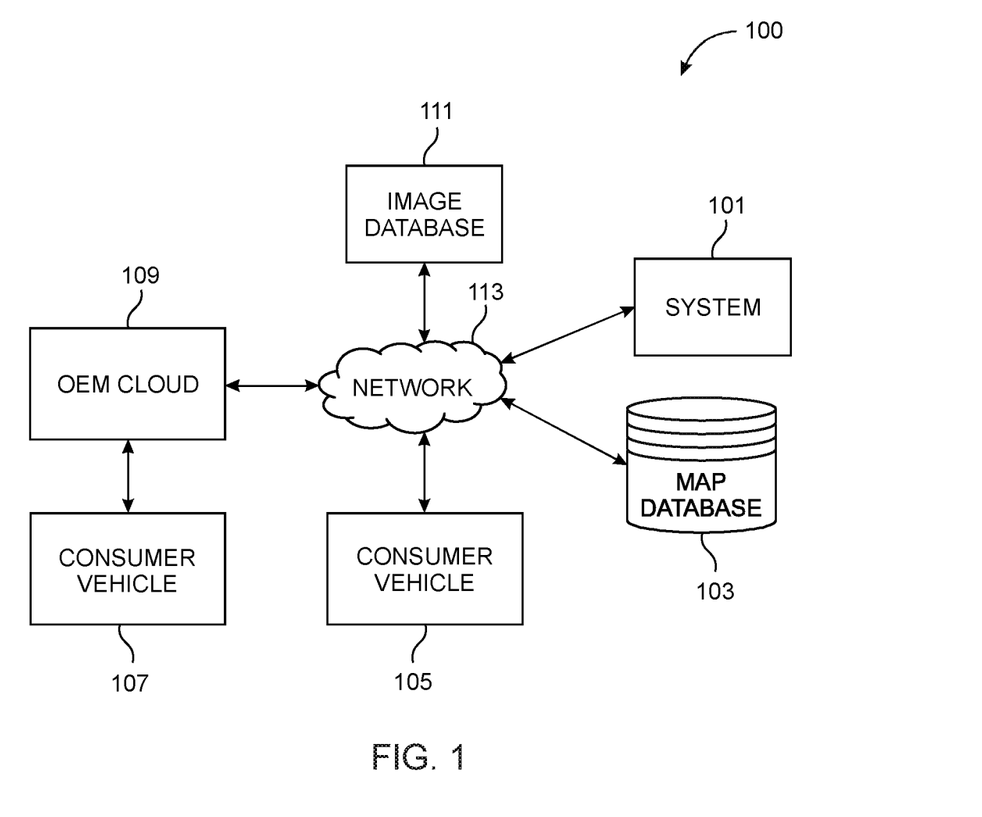
FIG. 1 is a block diagram that illustrates a network environment of a system for generating updated map data, in accordance with an example embodiment.

FIG. 1 is a block diagram that illustrates a network environment 100 of a system 101 for generating updated map data, in accordance with an example embodiment of the disclosure. The system 101 may be communicatively coupled with a map database 103, one or more user vehicles (such as consumer vehicle 105 or consumer vehicle 107 via OEM cloud 109), and an image database 111, via a network 113. One or more consumer vehicles, such as a consumer vehicle 107 may be communicatively connected to the OEM cloud 109 which in turn may be accessible to the system 101 via the network 113. Additionally or alternately, in some example embodiments, one or more consumer vehicles 105 may be communicatively coupled to the map database 103, directly via the network 113. Hereinafter, the phrases "consumer vehicles" and "user vehicles" may be used interchangeably and would mean the same.

In one embodiment, each of the one or more user vehicles (105 or 107) may be equipped with various sensors for generating or collecting vehicular sensor data. In one embodiment, the vehicular sensor data may comprise sensor data related to one or more posted speed signs and data associated with a geographic location or coordinates at which the sensor data was collected. The sensor data may serve as observation data that is separable as location-aware training and evaluation datasets according to their data collection locations. By way of example, the sensors may include a radar system, a LiDAR system, a positioning sensor for gathering location data such as a GNSS sensor (e.g. GPS, Galileo, BeiDou, GLONASS receiver), motion sensor such as accelerometer, magnetic field sensors such as a magnetometer and/or compass, orientation sensor such as a gyroscope, luminosity sensor, a network detection sensor for detecting wireless signals or receivers for different short-range communications (e.g., Bluetooth, Wi-Fi, Li-Fi, near field communication (NFC)), temporal information sensors, a camera/imaging sensor for gathering image data, an audio recorder for gathering audio data, velocity sensors, switch sensors for determining whether one or more vehicle switches are engaged, and the like.

Other examples of sensors of the user vehicle (105 or 107) may include a plurality of first sensors to capture the first sensor data. The plurality of first sensors may include light sensors, orientation sensors augmented with height sensors and acceleration sensor (e.g., an accelerometer may be configured to measure acceleration and may be used to determine orientation of the vehicle), tilt sensors to detect the degree of incline or decline of the vehicle along a path of travel, moisture sensors, pressure sensors, etc. Further, the location may be determined by visual odometry, triangulation systems, such as, A-GPS, Cell of Origin, or other location extrapolation technologies.

In some example embodiments, each of the one or more consumer vehicles (105, 107) may be one of autonomous, semi-autonomous, or manually driven. An autonomous vehicle, as used throughout this disclosure, may refer to a vehicle having autonomous driving capabilities at least in some conditions. The autonomous vehicle may also be known as a driverless car, robot car, self-driving car or autonomous car. In accordance with an embodiment, the system 101 may retrieve the first sensor data directly from the one or more consumer vehicles (105, 107) with connected communications capabilities (e.g., cellular or other wireless communications equipped vehicles) or from the Original Equipment Manufacturer (OEM) cloud 109. The OEM cloud may be operating an OEM platform (e.g., a services platform) that collects first sensor data from a consumer vehicle such as consumer vehicle 107. The retrieval of the first sensor data and/or the map data may occur in real-time or near real-time, continuously, periodically, according to a schedule, on demand, etc.

The network 113 may be wired, wireless, or any combination of wired and wireless communication networks, such as cellular, Wi-Fi, internet, local area networks, or the like. In one embodiment, the network 113 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fibre-optic network, and the like, or any combination thereof. In addition, the wireless network may be, for 1 may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, ITU-IMT 2020 networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET).

As exemplarily illustrated, the map database 103 may store node data, road segment data or link data, point of interest (POI) data, posted signs related data, or the like. The map database 103 may also include cartographic data, routing data, and/or maneuver data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road/link data and the node data may represent a road network, such as, used by vehicles, for example, cars, trucks, buses, motorcycles, and/or other entities. Optionally, the map database 103 may contain path segment and node data records or other data that may represent pedestrian paths or areas in addition to or instead of the vehicle road record data, for example. The road/link segments and nodes may be associated with attributes, such as geographic coordinates, street names, address ranges, speed limits, turn restrictions at intersections, and other navigation related attributes, as well as POIs, such as, fuelling stations, hotels, restaurants, museums, stadiums, offices, auto repair shops, buildings, stores, parks, etc. The map database 103 may include data about the POIs and their respective locations in the POI records. The map database 103 may additionally include data about places, such as, cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 103 may include event data (e.g., traffic incidents, construction activities, scheduled events, unscheduled events, etc.) associated with the POI data records or other records of the map database 103. The map database 103 may additionally include data related to road objects, such as, location of the road objects, diversions to be caused as indicated in the road objects, suggested routes to avoid congestion to be caused as indicated in the road objects, etc. The data related to road objects may be fetched from external systems, such as, roadwork planning system of the municipalities.

A content provider, such as, a map developer may maintain the map database 103. By way of example, the map developer may collect geographic data to generate and enhance the map database 103. There may be different ways used by the map developer to collect data. These ways may include obtaining data from other sources, such as municipalities or respective geographic authorities. In addition, the map developer may employ field personnel to travel by dedicated vehicles along roads throughout the geographic region to observe features and/or record information about them, for example. Crowdsourcing of geographic map data may also be employed to generate, substantiate, or update map data. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The gathering of large quantities of crowd-sourced data may facilitate the accurate modelling and mapping of an environment, whether it is a road segment or the interior of a multi-level parking structure. Also, remote sensing, such as aerial or satellite photography, may be used to generate map geometries directly or through machine learning as described herein.

The map database 103 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, for example. The navigation-related functions may correspond to vehicle navigation, pedestrian navigation, navigation to a favoured parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

In some embodiments, the map database 103 may be a master geographic database configured at a server side, but in alternate embodiments, a client side map database 103 may represent a compiled navigation database that may be used in or with end user devices (e.g., the consumer vehicles 105, 107) to provide navigation, speed adjustment and/or map-related functions to navigate through roadwork zones. The map database 103 may be used with the end user device, to provide the user with navigation features. In such a case, the map database 103 may be downloaded or stored on the user equipment (e.g., the consumer vehicles 105, 107) which may access the map database 103 through a wireless or wired connection, over the network 103.

The map database 103 may store first sensor data captured by a plurality of first sensors associated with consumer vehicles (e.g. the consumer vehicles 105, 107). Such consumer vehicles may act as data gatherers for building and updating the map database 103. The consumer vehicles such as 105, 107, may capture data associated with road objects (such as road signs), process the captured data, and transmit the processed data to the map database 103 for storage. The captured data may comprise image data associated with the road and road objects, location data, heading data, time of capture, and the like. The consumer vehicles may execute image recognition and other data processing (edge computing) to extract sign attributes such as sign type, sign value, latitude, longitude, heading of sign, and the like, associated with the captured road sign. The consumer vehicles may then forward the processed data (with extracted sign attributes) to the map database 103 for storage. Hereinafter, such data stored in the map database 103 may be referred to as "map data". Moreover, since the map data is based on first sensor data captured by the plurality of first sensors, it may interchangeably be referred to as "first sensor data".

The image database 111 may be a data storage medium that is configured to store second sensor data captured by a plurality of second sensors associated with one or more dedicated vehicles possessing high end sensors. The image database 111 may be updated periodically by deploying the dedicated vehicles. The image database 111 may store images (hereinafter "image data") captured by high end imaging sensors installed in the dedicated vehicles. Additionally, the image database 111 may store additional data captured along with the image data, such as time of capture, location, heading etc. Since the image database 111 may be built and updated using the high end second sensors, the data stored in the image database may also be referred to as "second sensor data".

Figure 2:
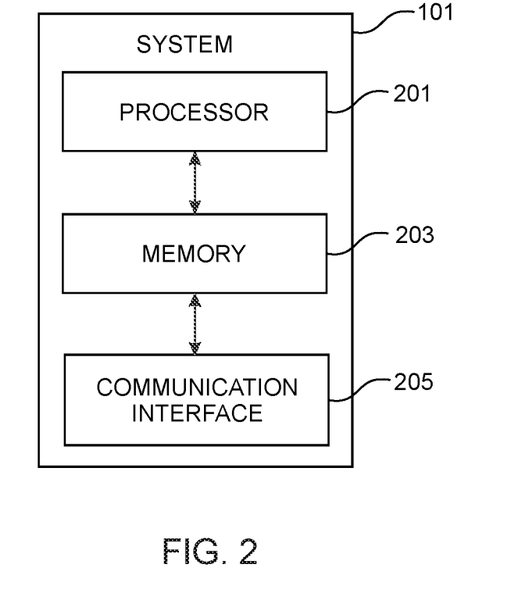
FIG. 2 is a block diagram that exemplarily illustrates a system for generating updated map data, in accordance with an example embodiment.

FIG. 2 illustrates a block diagram of a system for generating updated map data, in accordance with an example embodiment. The system 101 may comprise at least one processor 201 and at least one memory 203. The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally, or alternatively, the processor 201 may include one or more processors configured in tandem via the bus to enable independent execution of instructions, pipelining and/or multithreading.

The memory 203 may be non-transitory and may include, for example, one or more volatile and/or non-volatile memories. For example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present invention. For example, the memory 203 could be configured to buffer input data for processing by the processor 201. Additionally, or alternatively, the memory 203 could be configured to store instructions for execution by the processor 201.

The processor 201 (and/or co-processors or any other processing circuitry assisting or otherwise associated with the processor 201) may be in communication with the memory 203 via a bus for passing information among components of the system (for example the system 101). The processor 201 may be configured to execute instructions stored in the memory 203 or otherwise accessible to the processor 201. Additionally, or alternatively, the processor 201 may be configured to execute hard coded functionality. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed.

The communication interface 205 may comprise input interface and output interface for supporting communications to and from the system 101. The communication interface 205 may be any means such as a device or circuitry embodied in either hardware or a combination of hardware and software that is configured to receive and/or transmit data to/from a communications device in communication with the system 101. In this regard, the communication interface 205 may include, for example, an antenna (or multiple antennae) and supporting hardware and/or software for enabling communications with a wireless communication network. Additionally, or alternatively, the communication interface 205 may include the circuitry for interacting with the antenna(s) to cause transmission of signals via the antenna(s) or to handle receipt of signals received via the antenna(s). In some environments, the communication interface 205 may alternatively or additionally support wired communication. As such, for example, the communication interface 205 may include a communication modem and/or other hardware and/or software for supporting communication via cable, digital subscriber line (DSL), universal serial bus (USB) or other mechanisms.

Figure 3:
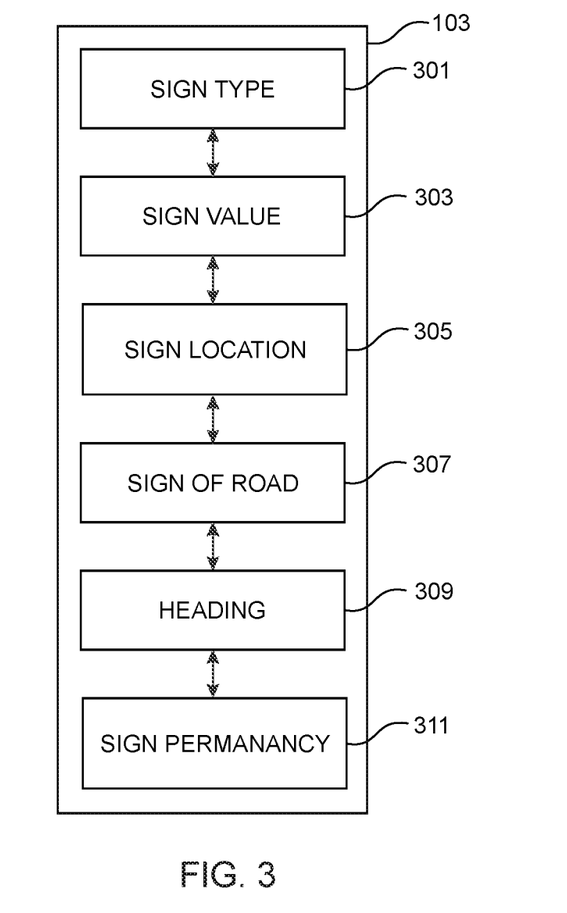
FIG. 3 is a block diagram that exemplarily illustrates a map database for generating updated map data, in accordance with an example embodiment.

FIG. 3 illustrates a block diagram that exemplarily illustrates a map database (for example the map database 103) used by a system (for example the system 101) for generating updated map data, in accordance with an example embodiment. The map database 103 may receive processed sensor data from the consumer vehicles (e.g. 105, 107) and store the received data. As shown, the map database 103, for example, may comprise sign type 301, sign value 303, sign location 305, side of road 307, heading 309 and sign permanency 311. More, fewer or different data records may be provided. The data stored in the map database 103 may be first sensor data captured by a plurality of first sensors associated with consumer vehicles (e.g. 105, 107).

In exemplary embodiments, the sign types 301 may be road signs representing the different kinds of the traffic signs such as, but not limited to, warning signs, pedestrian signs, speed signs, and lane control signs. The sign value 303 may represent the value of speed sign captured by the plurality of first sensors associated with the consumer vehicles (105, 107). For instance, in an event that the captured sign is a speed limit indication of 30 km/hr. then the sign value may be equal to 30 km/hr. The sign location 305 may represent the geographic coordinates of the position of a road sign. The sign location 305 may further comprise associated attributes such as road names, address ranges, cities, towns, or other communities, and other geographic features, such as bodies of water, mountain ranges, etc. The side of road 307 may represent either left side, right side, or middle of the road at which the road sign is located. The heading 309 may be the heading associated with the road sign. The sign permanency 311 may represent whether the speed sign is static or variable. The speed signs may include speed limit signs. The speed limit sign may be static or dynamic. Sign values of the speed signs may vary based on traffic conditions in their vicinity.

Figure 4:
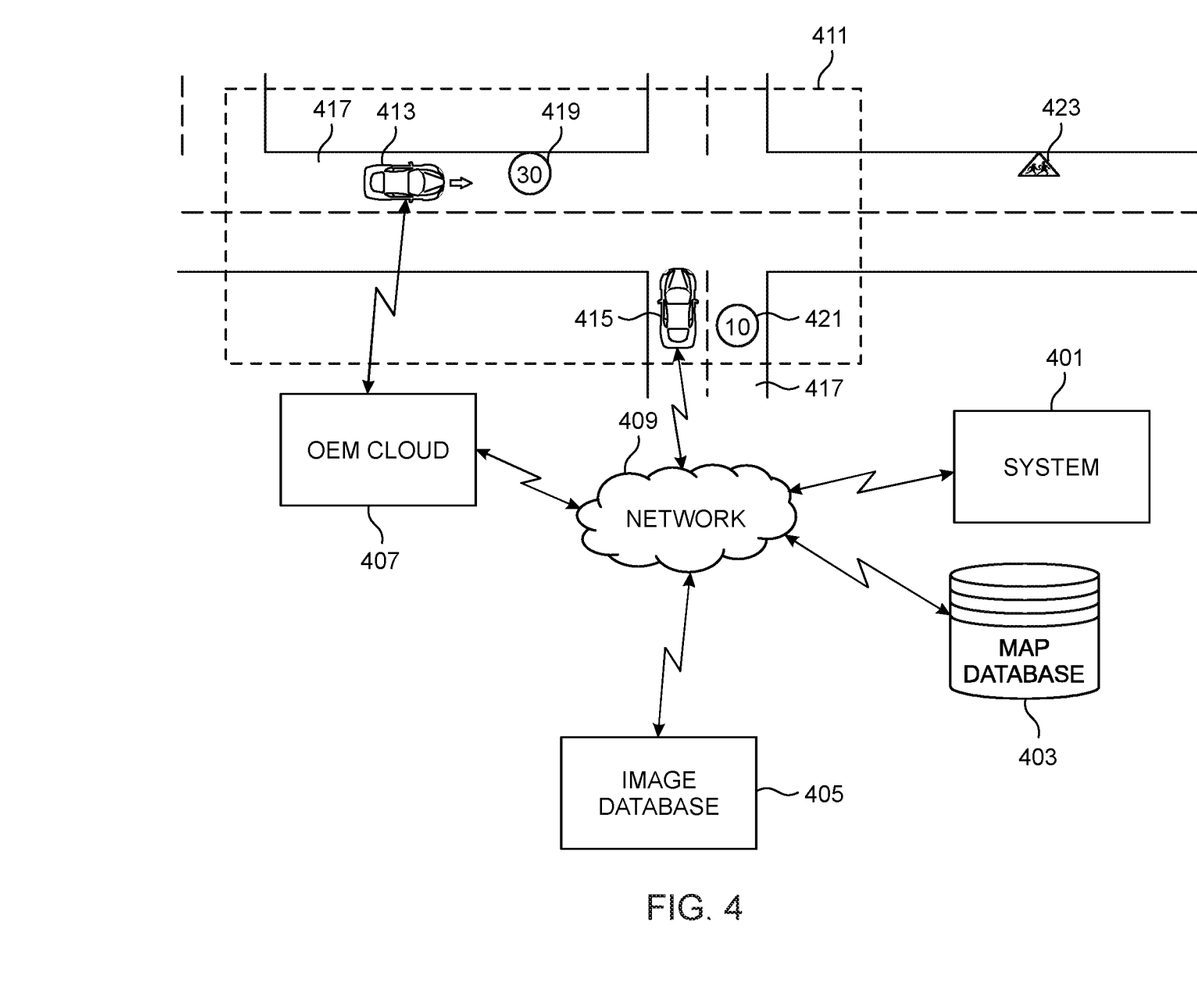
FIG. 4 is a schematic diagram that exemplarily illustrates a working environment of a system for generating updated map data, in accordance with an example embodiment.

FIG. 4 is a schematic diagram that exemplarily illustrates a working environment of a system for generating updated map data, in accordance with an example embodiment. A system 401 may be communicatively coupled to a map database 403, via a network 409. Additionally, the system 401 may be communicatively coupled to an image database 405, via the network 409. A first consumer vehicle 413 may be communicatively connected to an OEM cloud 407 which in turn may be accessible to the system 401 via the network 409. A second consumer vehicle 415 may be communicatively coupled directly to the map database 403, via the network 409. In some example embodiments, one of the consumer vehicles 413 and 415 may act as a data gatherer for the map database 403 while the other one of the consumer vehicles 413 and 415 may act as a beneficiary of the updated map data generated by the system 401. The first consumer vehicle 413 and the second consumer vehicle 415 may be operating on separate sections of a road 417. On the road 417, various road signs 419, 421, 423 may be posted. The posted road signs (419, 421, 423) may include different kinds of traffic signs such as warning signs, pedestrian signs, speed signs, lane control signs and the like, positioned along the road.

The map database 403 may store first sensor data in a manner similar to that discussed with reference to the map database 103 of FIG. 1 and FIG. 3. The map database 403 may further comprise one or more attributes of each of the posted road signs (419, 421, 423). The one or more attributes may comprise one or more of the sign type (e.g. speed limit start), sign location (e.g. latitude/longitude), heading, side of road (left, right, middle), sign value (e.g. 60 km/hr) or sign permanency (e.g. static, variable). For instance, in the event that the sign captured on the road 417 is speed limit indication of 30 km/hr then the sign value is 30 km/hr. The sign location may represent the geographic coordinates of the position of the road sign. The sign location may further be associated attributes such as road names, address ranges, cities, towns, or other communities, and other geographic features, such as bodies of water, mountain ranges, etc. The side of road may represent either left or right side of the road 417 at which the road sign may be located. The heading may be the heading associated with the road sign. The heading related with a road sign may be the heading of the vehicle capturing the road sign. The sign permanency may represent whether the speed sign is static or variable. The speed signs may include speed limit sign and the speed limit sign may be static road signs or variable road signs positioned along the road 417.

The image database 405 may store second sensor data captured by high end sensors of one or more dedicated vehicles. The second sensor data may be of higher accuracy than the first sensor data. The image database 405 may be similar to the image database 111 as discussed with reference to FIG. 1.

The system 401 may define a geographical region 411 based on map data. The geographical region 411 may be represented as a bounding box. Hereinafter both the geographical region as well as the bounding box may be represented and referred to by the numeral 411. The determination of the geographical region 411 may be in response to a request by a consumer vehicle (413, 415) or by a user associated with the consumer vehicle (413, 415). As such, the system 410 may define the geographic region based on the geo-location of the consumer vehicle (413, 415). In some example embodiments, the determination of the geographical region 411 may also be initiated autonomously by the system 401 associated with the map database 405, to update the map data in the map database 403 periodically. The determination of the geographical region 411 may likewise be in response to the switching of the consumer vehicle (413, 415) from manual driving mode to autonomous driving mode or vice versa. The geographical region 411 may be of any arbitrary shape such as rectangle, circle, trapezoidal, square, triangle, parallelogram and the like. In defining the shape and size of the geographical region 411, factors such as traffic density of the region, functional class/category of the roads in the region, population density, metropolitan category etc. may be taken into consideration. For example, the bounding box indicating the geographic region 411 may extend to a few hundred meters in case the geographic region 411 is in an area with high traffic density (where the number of posted signs may be high). In some example embodiments, the bounding box representing the geographic region 411 may extend to several kilometers if the geographic region 411 is in an area where the traffic density is less than a threshold.

The system 401 may obtain first sensor data associated with a plurality of first road signs lying within the bounding box 411. The first sensor data may be the map data corresponding to the posted speed sign within the geographical region 411, for a predefined date. The first sensor data may correspond to one or more first attributes of each of the plurality of first road signs. The one or more first attributes may comprise one or more of sign type, sign value, sign location, side of road, heading, or sign permanency.

The system 401 may transmit a spatial query to the image database 405 based on the geographical region shown by the bounding box 411. In response to the spatial query of the image database 405, the system 401 may receive the second sensor data/image data associated with the geographic region shown by the bounding box 411, via the network 409. The second sensor data may comprise the images of the road signs corresponding to the geographical region shown by the bounding box 411. The system 401 may filter the second sensor data based on the predefined date to identify if there are any images that were captured by dedicated vehicles in the same time frame. The filtering may be based on an offset of the predefined date that may be preset depending on various factors such as the time of the year, category of the geographic area 411 and the like. It may be contemplated that the date based filtering criteria may be configured in any suitable manner as per requirements. In accordance with an embodiment, the system 401 may be configured to filter the second sensor data in order of +2 weeks or −2 weeks with respect to the predefined date if the date is summer time. In accordance with an embodiment, the system 401 may filter the second sensor data in order of +4 weeks or −4 weeks with respect to the given date if the date is winter time. Succeeding the date filtering, when no data is obtained by the system 401, a second geographic region may be determined and the system may repeat the processing steps discussed above. Alternately, the system 401 may obtain date filtered data based on the filtering of the second sensor data obtained from the image database 405.

Succeeding the date filtering, the system 401 may obtain a plurality of road sign images in the date filtered data. The date filtered data may be fed to a machine learning model which identifies a plurality of road sign image frames containing one or more road signs. In some example embodiments, the road sign images may be decoded to text manually or using computer vision. Such decoding to text may be performed to extract one or more attributes of the road sign images. The system 401 may next obtain one or more second attributes corresponding to each of the plurality of road sign images. For this purpose, the machine learning model may be trained in advance to predict the one or more second attributes based on the date filtered data. In some example embodiments, the one or more second attributes may be obtained manually. The one or more second attributes may comprise one or more of the sign type (e.g. speed limit start), sign location (e.g. latitude/longitude), heading, side of road (e.g. left, right, middle), sign value (e.g. 60 km/hr) or sign permanency (e.g. static, variable) associated with the one or more road signs.

The system 401 may determine a matching score based on a matching criteria. The matching score may indicate a count of pairs of matched road signs between the plurality of first road signs and the plurality of road sign images. The matching criteria may comprise one or more conditions for temporal alignment or spatial alignment of the first sensor data and the second sensor data. The matching criteria may be based on the first attributes and the second attributes. The matching criteria may comprise one or more of a first criterion that the sign type of a road sign in the plurality of first road signs is same as the sign type of a road sign in the plurality of road sign images, a second criterion that the sign value of the road sign in the plurality of first road signs is same as the sign value of the road sign in the plurality of road sign images, a third criterion that the heading of the road sign in the plurality of first road signs is within a threshold value from the heading of the road sign in the plurality of road sign images, a fourth criterion that the longitudinal distance between the road sign in the plurality of first road signs and the road sign in the plurality of road sign images is within a first threshold distance, or a fifth criterion that the lateral distance between the road sign in the plurality of first road signs and the road sign in the identified plurality of road sign images is within a second threshold distance. In case the road sign in the plurality of first road signs matches to more than one road sign in the plurality of road sign images, then the closest road sign in terms of the longitudinal distance may be considered as the matched road sign between the plurality of first road signs and the plurality of road sign images.

The system 401 may determine a sign matching efficiency by dividing the matching score by a count of the plurality of road sign images. The determined efficiency may be utilized to update the map data in the map database. Further, the system 401 may generate a notification indicating the degree of reliability of the first sensor data, based on the updated map data. The updated map data thus generated is indicative of the reliability of the map data and is more meaningful. Based on the category of the geographic region 411, a threshold value may be configured. If the matching efficiency is greater than or equal to the threshold value for the geographic region 411, the map data of the map database 403 may be deemed reliable. Accordingly, an autonomous vehicle (such as the consumer vehicle 413, 415) may thus continue to operate in autonomous mode based on the map data being deemed reliable by the system 401. However, in an alternate scenario, if the matching efficiency is less than the threshold value for the geographic region 411, the autonomous vehicle may switch from autonomous operation to manual mode of operation. Therefore, the system 401 aids in providing an improved navigation control for the autonomous vehicle. Although, the aforesaid use case is described with reference to an autonomous vehicle, it may be contemplated that the determined matching efficiency may also be useful for manually driven vehicles that may utilize the map data for navigation purposes. Accordingly, various other applications within the scope of the invention may be possible.

Further, in some example embodiments, the updated map data may be broadcasted to one or more users. Additionally, the system 401 may further determine a distance between road signs of each pair of the at least one pair of matched road signs and determine a spatial precision for the first sensor data/map data, based on the determined distance between road signs of each pair of the at least one pair of matched road signs. The spatial precision may be determined as the Euclidian distance between road signs of each pair of the at least one pair of matched road signs.

Figure 5:
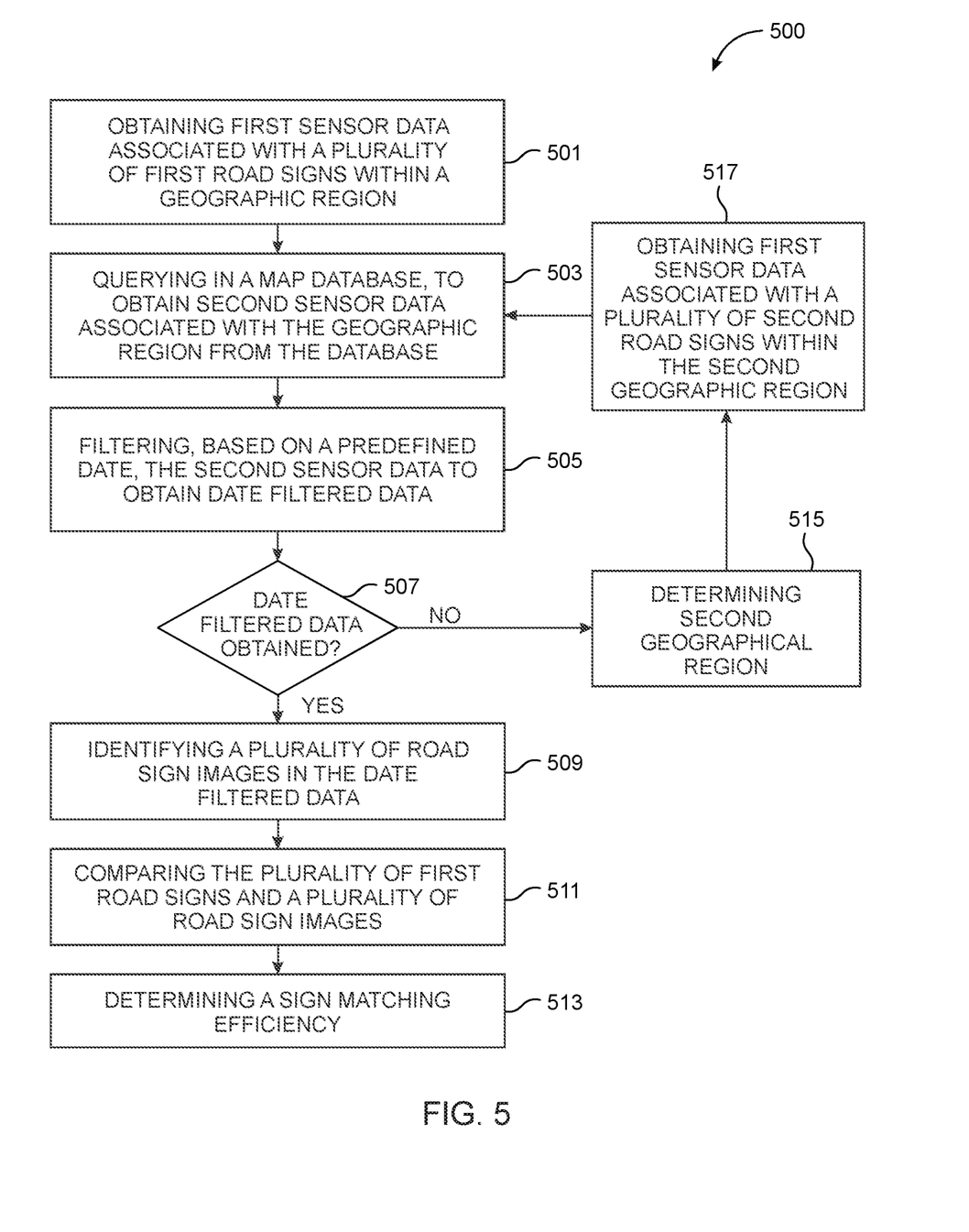
FIG. 5 illustrates a flowchart for implementation of an exemplary method to determine a sign matching efficiency, in accordance with an example embodiment.

FIG. 5 illustrates a flowchart for implementation of an exemplary method to determine a sign matching efficiency, in accordance with an example embodiment of the disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

The method 500 for generating updated map data may include, at 501, obtaining first sensor data associated with a plurality of first road signs within a geographic region. The geographical region may be represented by a bounding box. The determination of the geographical region may be in response to a request by a user. The determination of the geographical region may also be initiated autonomously by the system associated with the map database, to update the map data in the map database periodically. The determination of the geographical region may, likewise, be in response to the switching of the consumer vehicle from manual driving mode to autonomous driving mode. The geographical region may be of any size or shape such as rectangle, circle, trapezoidal, square, triangle, parallelogram and the like.

The first sensor data may correspond to the map data corresponding to the posted speed sign within the geographical region, for a predefined date. The first sensor data may correspond to one or more first attributes of each of the plurality of first road signs, wherein the one or more first attributes comprise one or more of sign type, sign value, sign location, side of road, heading, or sign permanency. In some example embodiments, the first sensor data may be the map data stored in the map database (for example map database 103).

At 503, the method may include querying in an image database for second sensor data captured for the geographic region. The image database may comprise second sensor data captured by the plurality of second sensors associated with the dedicated vehicles. At 503, the method may further include, responsive to querying of the image database, obtaining second sensor data associated with the geographic region from the image database. The second sensor data may comprise the images captured by the dedicated vehicles for road signs within the geographic region. The images may comprise the road signs corresponding to the geographical region.

At 505, the method may include filtering, based on the predefined date, the second sensor data to obtain date filtered data. Querying may be carried out prior to the date filtering to reduce burden of processing on engine of the image database. At 505, the method may include filtering the second sensor data based on the predefined date. The date based filtering criteria may be in order of +2 weeks or −2 weeks with respect to the predefined date if the date is summer time. Alternately, the date based filtering criteria may be in order of +4 weeks or −4 weeks with respect to the predefined date if the date is winter time.

At 507, the method may include, checking whether date filtered data is obtained or not. When the date filtered data does not contain data for the predefined date then the control passes to 515 where the method may include determining a second geographical region.

At 517, the method may include obtaining first sensor data associated with a plurality of second road signs within the second geographic region. The control then passes to 503.

At 507, when the date filtered data contains data for the predefined date, the method may include, at 509, identifying a plurality of road sign images in the date filtered data. The date filtered data may be fed to the machine learning model which identifies a plurality of road sign image frames containing the road signs. The plurality of road sign images may be decoded to text manually or using computer vision to extract one or more attributes associated with each of the plurality of road sign images.

At 509, the method may also include obtaining one or more second attributes corresponding to each of the plurality of road sign images. Alternately, obtaining the one or more second attributes may be performed manually. The one or more second attributes may comprise one or more of the sign type (e.g. speed limit start), sign location (e.g. latitude/longitude), heading, side of road (e.g. left, right, middle), sign value (e.g. 60 KPH) or sign permanency (e.g. static, variable).

At 511, the method may include comparing the attributes of the plurality of first road signs and the plurality of road sign images. At 511, comparing may include determining a matching score based on a matching criteria. The matching score may indicate a count of pairs of matched road signs between the plurality of first road signs and the plurality of road sign images. The matching criteria may be based on the first attributes and the second attributes. The matching criteria may comprise one or more of a first criterion that the sign type of a road sign in the plurality of first road signs is same as the sign type of a road sign in the plurality of road sign images, a second criterion that the sign value of the road sign in the plurality of first road signs is same as the sign value of the road sign in the plurality of road sign images, a third criterion that the heading of the road sign in the plurality of first road signs is within a threshold value from the heading of the road sign in the plurality of road sign images, a fourth criterion that the longitudinal distance between the road sign in the plurality of first road signs and the road sign in the plurality of road sign images is within a first threshold distance, or a fifth criterion that the lateral distance between the road sign in the plurality of first road signs and the road sign in the identified plurality of road sign images is within a second threshold distance.

At 513, the method may include determining a sign matching efficiency for the geographic region. The sign matching efficiency may be determined by dividing the matching score by a count of the plurality of road sign images, for each of the road sign in the plurality of first road signs. The sign matching efficiency for the geographic region may be determined by computing average of the sign matching efficiencies. The control passes to the end.

In an example embodiment, a system for performing the method of FIG. 5 above may comprise a processor (e.g. the processor 201) configured to perform some or each of the operations (501-517) described above. The processor may, for example, be configured to perform the operations (501-517) by performing hardware implemented logical functions, executing stored instructions, or executing algorithms for performing each of the operations. Alternatively, the system may comprise means for performing each of the operations described above. In this regard, according to an example embodiment, examples of means for performing operations 501-517 may comprise, for example, the processor 201 and/or a device or circuit for executing instructions or executing an algorithm for processing information as described above.

Figure 6:
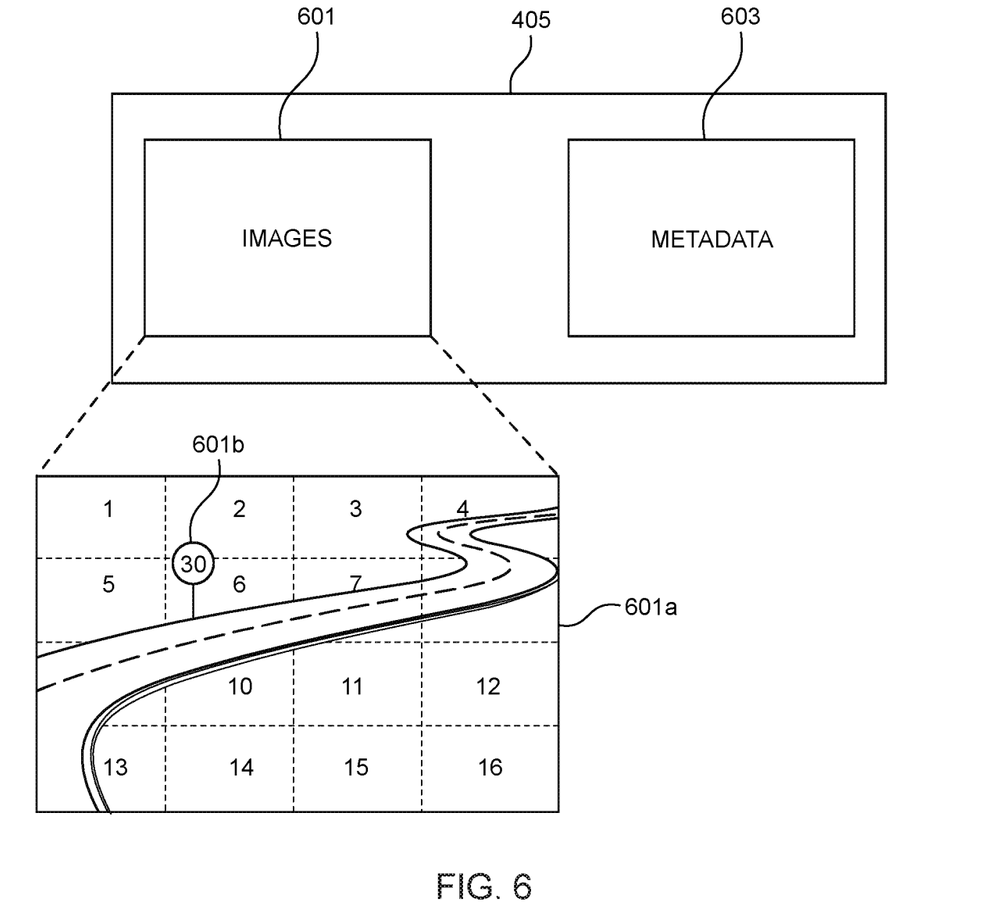
FIG. 6 is a block diagram of an image database that is used by a system for generating updated map data, in accordance with an example embodiment.

FIG. 6 is a block diagram of an image database such as the image database 405 that is used by the system 401 for generating updated map data, in accordance with an example embodiment. The image database 405 may comprise one or more images 601 and metadata 603 associated with the one or more images 601. The one or more images 601 may be captured by high end sensors associated with dedicated vehicles and stored in the image database 405. The dedicated vehicles may be deployed for capturing high quality images of navigation path. The one or more images 601 may include surroundings and road signs situated along the navigation path. The one or more images 601 may be captured at different locations at different time.

The metadata 603 may comprise data corresponding to each of the images in the images 601 and each of the road signs in each of the one or more images 601. The metadata may comprise one or more of sign type sign location, heading, side of road, sign value or sign permanency. In exemplary embodiments, the sign types are road signs representing the different kinds of the traffic signs such as warning signs, pedestrian signs, speed signs, lane control signs and the like. The sign value may represent the value of speed sign captured. The sign location may represent the geographic coordinates of the position of road sign. The sign location may have associated attributes such as road names, address ranges, cities, towns, or other communities, and other geographic features, such as bodies of water, mountain ranges, etc. The side of road may represent either left or right side of the road at which the road sign is located. The heading may be the heading associated with road sign. The sign permanency may represent the speed sign is static or variable. The speed signs may be static signs or variable signs positioned along the road. Sign values of variable signs may vary based on traffic conditions in the vicinity.

The images 601 may be fed to a machine learning model. In accordance with an embodiment, the machine learning model may identify a plurality of road signs in frames of each of the images. For example, an image 601a of the one or more images 601, may be fed to the machine learning model. In accordance with an embodiment, the machine learning model may identify frame 6 containing the road sign 601b, in the frames (1-16) of the image 601a. The machine learning model may further extract metadata 603 corresponding to the image 601a.

Figure 7:
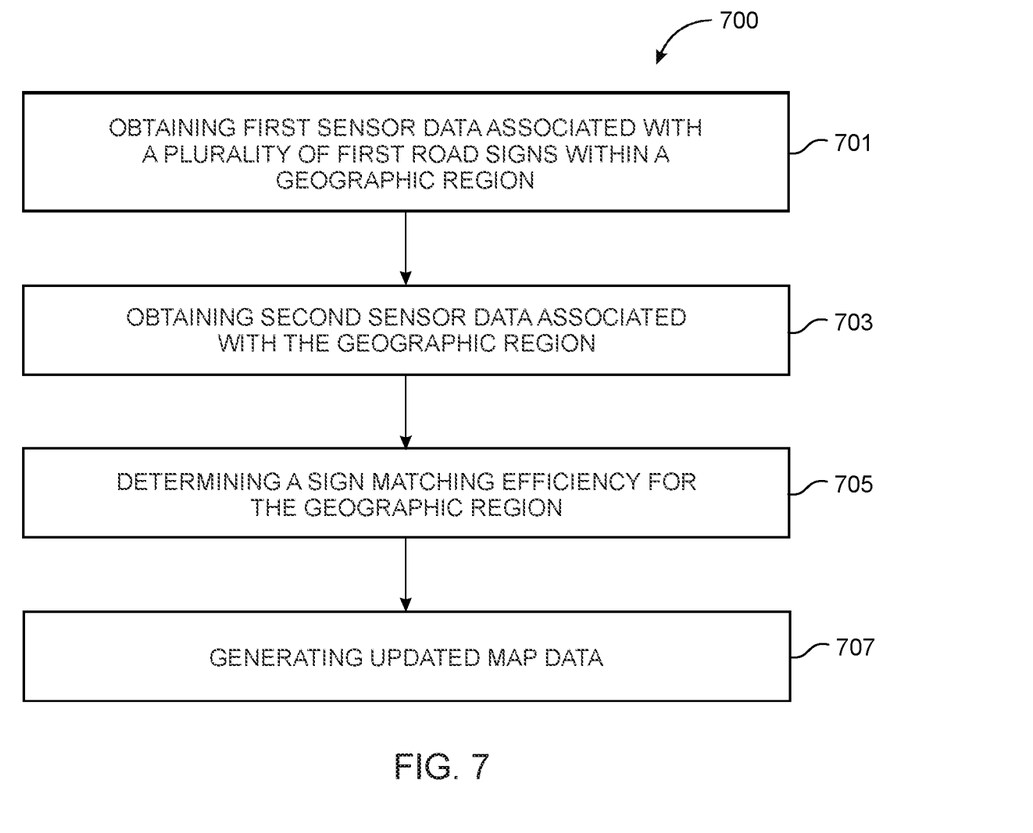
FIG. 7 illustrates a flowchart for implementation of an exemplary method to generate updated map data, in accordance with an example embodiment.

FIG. 7 illustrates a flowchart for implementation of an exemplary method to generate updated map data, in accordance with an example embodiment of the disclosure. It will be understood that each block of the flowcharts and combination of blocks in the flowcharts may be implemented by various means, such as hardware, firmware, processor, circuitry, and/or other communication devices associated with execution of software including one or more computer program instructions.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

The method 700 for generating updated map data, may comprise at 701, obtaining first sensor data associated with a plurality of first road signs within a geographic region. The determining of the geographical region may be in response to a request by the user. The determining of the geographical region may also be initiated autonomously to update the map data in the map database periodically. The determining of the geographical region may, likewise, be in response to the switching of a consumer vehicle from manual driving mode to autonomous driving mode. The geographical region may be of any arbitrary size and shape such as rectangle, circle, trapezoidal, square, triangle, parallelogram and the like.

At 703, the method may include obtaining second sensor data associated with the geographic region. Obtaining the second sensor data may comprise querying in an image database. The image database may comprise the second sensor data captured by the plurality of second sensors associated with the dedicated vehicles. In response to querying of the image database, second sensor data associated with the geographic region may be obtained from the image database.

At 705, the method may include determining a sign matching efficiency for the geographic region. The determining of the sign matching efficiency comprises determining of a matching score based on a matching criteria. The matching score indicates a count of pairs of matched road signs between the plurality of first road signs and the plurality of road sign images. The matching criteria may be based on the first attributes and the second attributes.

Additionally, a sign matching efficiency may be determined by dividing the matching score by a count of the plurality of road sign images, for each of the road sign in the plurality of first road signs. The sign matching efficiency for the geographic region may be determined by computing average of the sign matching efficiencies.

At 707, the method may include generating the updated map data based on the first sensor data and the determined sign matching efficiency. The control passes to the end.

Many modifications and other embodiments of the inventions set forth herein will come to mind to one skilled in the art to which these inventions pertain having the benefit of the teachings presented in the foregoing descriptions and the associated drawings. The focus is on road signs but the methods and applications discussed herein can also apply to other road objects. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for generating updated map data, comprising:
    at least one memory configured to store computer executable instructions; and
    at least one processor configured to execute the computer executable instructions to:
    obtain first sensor data associated with a plurality of first road signs within a geographic region, wherein the first sensor data is captured by a plurality of first sensors for a predefined date, wherein the first sensor data corresponds to one or more first attributes of each of the plurality of first road signs, wherein the one or more first attributes comprise one or more of sign type, sign value, sign location, side of road, heading, or sign permanency;
    obtain second sensor data associated with the geographic region, wherein the second sensor data is captured by a plurality of second sensors;
    determine a sign matching efficiency for the geographic region, based on the first sensor data and the second sensor data; and
    generate the updated map data, based on the determined sign matching efficiency.

2. The system of claim 1, wherein the at least one processor is further configured to:
    receive an input specifying the geographic region; and
    generate a notification message indicating a degree of reliability of the first sensor data, based on the updated map data.

3. The system of claim 1, wherein the at least one processor is further configured to transmit the updated map data to at least one vehicle.

4. The system of claim 1, wherein to determine the sign matching efficiency the at least one processor is configured to:
    filter, based on the predefined date, the second sensor data to obtain date filtered data;
    identify a plurality of road sign images in the date filtered data; and obtain, one or more second attributes corresponding to each of the plurality of road sign images, wherein the one or more second attributes comprise one or more of sign type, sign value, sign location, side of road, heading or sign permanency.

5. The system of claim 4, wherein to determine the sign matching efficiency the at least one processor is further configured to:
determine a matching score based on a matching criteria, wherein the matching score indicates a count of at least one pair of matched road signs between the plurality of first road signs and the plurality of road sign images, and
wherein the matching criteria is based on the one or more first attributes and the one or more second attributes.

6. The system of claim 5, wherein the matching criteria comprises one or more of:
a first criterion that the sign type of a road sign in the plurality of first road signs is same as the sign type of a road sign in the plurality of road sign images;
a second criterion that the sign value of the road sign in the plurality of first road signs is same as the sign value of the road sign in the plurality of road sign images;
a third criterion that the heading of the road sign in the plurality of first road signs is within a threshold value from the heading of the road sign in the plurality of road sign images;
a fourth criterion that the longitudinal distance between the road sign in the plurality of first road signs and the road sign in the plurality of road sign images is within a first threshold distance; or
a fifth criterion that the lateral distance between the road sign in the plurality of first road signs and the road sign in the plurality of road sign images is within a second threshold distance.

7. The system of claim 5, wherein to determine the sign matching efficiency the at least one processor is further configured to divide the matching score by a count of the plurality of road sign images.

8. The system of claim 5, wherein the at least one processor is further configured to:
determine a distance between road signs of each pair of the at least one pair of matched road signs; and
determine spatial precision for the first sensor data, based on the determined distance between road signs of each pair of the at least one pair of matched road signs.

9. A method for generating updated map data, comprising:
obtaining first sensor data associated with a plurality of first road signs within a geographic region, wherein the first sensor data is captured by a plurality of first sensors for a predefined date, wherein the first sensor data corresponds to one or more first attributes of each of the plurality of first road signs, wherein the one or more first attributes comprise one or more of sign type, sign value, sign location, side of road, heading, or sign permanency;
obtaining second sensor data associated with the geographic region, wherein the second sensor data is captured by a plurality of second sensors;
determining a sign matching efficiency for the geographic region, based on the first sensor data and the second sensor data; and
generating the updated map data, based on the determined sign matching efficiency.

10. The method of claim 9, further comprising:
receiving an input specifying the geographic region; and
generating a notification message indicating a degree of reliability of the first sensor data, based on the updated map data.

11. The method of claim 9, further comprising transmitting the updated map data to at least one vehicle.

12. The method of claim 9, wherein determining the sign matching efficiency comprises:
filtering, based on the predefined date, the second sensor data to obtain date filtered data;
identifying a plurality of road sign images in the date filtered data; and
obtaining, one or more second attributes corresponding to each of the plurality of road sign images, wherein the one or more second attributes comprise one or more of sign type, sign value, sign location, side of road, heading, or sign permanency.

13. The method of claim 12, wherein determining the sign matching efficiency comprises
determining a matching score based on a matching criteria,
wherein the matching score indicates a count of at least one pair of matched road signs between the plurality of first road signs and the plurality of road sign images, and
wherein the matching criteria is based on the one or more first attributes and the one or more second attributes.

14. The method of claim 13, wherein the matching criteria comprises one or more of:
a first criterion that the sign type of a road sign in the plurality of first road signs is same as the sign type of a road sign in the plurality of road sign images;
a second criterion that the sign value of the road sign in the plurality of first road signs is same as the sign value of the road sign in the identified plurality of road sign images;
a third criterion that the heading of the road sign in the plurality of first road signs is within a threshold value from the heading of the road sign in the plurality of road sign images;
a fourth criterion that the longitudinal distance between the road sign in the plurality of first road signs and the road sign in the plurality of road sign images is within a first threshold distance; or
a fifth criterion that the lateral distance between the road sign in the plurality of first road signs and the road sign in the plurality of road sign images is within a second threshold distance.

15. The method of claim 13, wherein determining the sign matching efficiency comprises dividing the matching score by a count of the plurality of road sign images.

16. The method of claim 13, further comprising:
determining a distance between road signs of each pair of the at least one pair of matched road signs; and
determining spatial precision for the first sensor data, based on the determined distance between road signs of each pair of the at least one pair of matched road signs.

17. A computer program product comprising non-transitory a computer-readable medium having stored thereon computer-executable instructions which when executed by one or more processors, cause the one or more processors to carry out operations for generating updated map data, the operations comprising:
obtaining first sensor data associated with a plurality of first road signs within a geographic region, wherein the first sensor data is captured by a plurality of first sensors for a predefined date, wherein the first sensor data corresponds to one or more first attributes of each of the plurality of first road signs, wherein the one or more first attributes comprise one or more of sign type, sign value, sign location, side of road, heading, or sign permanency;

obtaining second sensor data associated with the geographic region, wherein the second sensor data is captured by a plurality of second sensors;

determining a sign matching efficiency for the geographic region, based on the first sensor data and the second sensor data; and generating the updated map data, based on the determined sign matching efficiency.

18. The computer program product of claim 17, wherein the operations further comprise:

receiving an input specifying the geographic region; and generating a notification message indicating a degree of reliability of the first sensor data, based on the updated map data.

19. The computer program product of claim 17, wherein the operations further comprise:

transmitting the updated map data to at least one vehicle.

20. The computer program product of claim 17, wherein determining the sign matching efficiency comprises:

filtering, based on the predefined date, the second sensor data to obtain date filtered data;

identifying a plurality of road sign images in the date filtered data; and obtaining, one or more second attributes corresponding to each of the plurality of road sign images, wherein the one or more second attributes comprise one or more of sign type, sign value, sign location, side of road, heading, or sign permanency.

\* \* \* \* \*